US 11,138,538 B2

(12) United States Patent
Newman et al.

(10) Patent No.: US 11,138,538 B2
(45) Date of Patent: Oct. 5, 2021

(54) INVENTORY MANAGEMENT SYSTEM

(71) Applicant: ADP, LLC, Roseland, NJ (US)

(72) Inventors: Kurt Newman, Columbus, GA (US); Debashis Ghosh, Charlotte, NC (US); Ramsay Cole, Brooklyn, NY (US)

(73) Assignee: ADP, LLC, Roseland, NJ (US)

( * ) Notice: Subject to any disclaimer, the term of this patent is extended or adjusted under 35 U.S.C. 154(b) by 216 days.

(21) Appl. No.: 15/960,959

(22) Filed: Apr. 24, 2018

(65) Prior Publication Data

US 2019/0325366 A1 Oct. 24, 2019

(51) Int. Cl.
G06Q 10/00 (2012.01)
G06Q 10/06 (2012.01)
G06Q 10/08 (2012.01)
G06Q 30/02 (2012.01)

(52) U.S. Cl.
CPC ..... G06Q 10/06315 (2013.01); G06Q 10/087 (2013.01); G06Q 30/0205 (2013.01)

(58) Field of Classification Search
None
See application file for complete search history.

(56) References Cited

U.S. PATENT DOCUMENTS

| | | | | |
|---|---|---|---|---|
| 7,216,092 B1* | 5/2007 | Weber | ............... | G06Q 10/087 358/1.13 |
| 8,417,561 B2* | 4/2013 | Ghosh | ............ | G06Q 30/0205 705/7.34 |
| 10,699,222 B2* | 6/2020 | Hovis | ............... | G06Q 10/063 |
| 2010/0049538 A1* | 2/2010 | Frazer | ............... | G06Q 30/02 705/14.4 |
| 2010/0169170 A1* | 7/2010 | Fordyce, III | ............ | G06Q 30/00 705/14.17 |
| 2011/0137730 A1* | 6/2011 | McCarney | ......... | G06Q 30/0203 705/14.58 |
| 2011/0251868 A1* | 10/2011 | Mikurak | ............ | G06Q 30/0202 705/7.25 |
| 2012/0259722 A1* | 10/2012 | Mikurak | ............... | G06Q 50/12 705/26.1 |

(Continued)

OTHER PUBLICATIONS

Boyd, Steve, How to Measure Inventory Effectiveness, Mar. 6, 2018, Arkieva, https://blog.arkieva.com/measure-inventory-effectiveness/, p. 1-11. (Year: 2018).*

Primary Examiner — Joseph M Waesco
(74) Attorney, Agent, or Firm — Yee & Associates, P.C.

(57) ABSTRACT

A method, a computer system, and a computer program product for managing inventory for an organization. The computer system identifies human resources data regarding employees of organizations. The human resources data comprises geolocation data based at least partially on a geolocation of the organization and geolocations of the employees. The computer system determines a change in market dynamics relating to a set of geographic regions based at least partially on the human resources data. The computer system identifies transaction data for transactions involving a business merchant within a particular geographic region and a consumer. The computer system generates a suggested inventory for the business merchant. The suggested inventory is based at least partially on the determined change in market dynamics for the set of geographic regions in the transaction data for the business merchant.

21 Claims, 4 Drawing Sheets

(56) References Cited

U.S. PATENT DOCUMENTS

| | | | | |
|---|---|---|---|---|
| 2012/0278205 A1* | 11/2012 | Chin | G06Q 10/087 |
| | | | 705/28 |
| 2012/0284036 A1* | 11/2012 | Evans | G06Q 30/0241 |
| | | | 705/1.1 |
| 2013/0124263 A1* | 5/2013 | Amaro | G06Q 30/02 |
| | | | 705/7.34 |
| 2013/0268415 A1* | 10/2013 | Connors | G06Q 10/087 |
| | | | 705/28 |
| 2014/0019287 A1* | 1/2014 | Carlson | G06Q 30/0275 |
| | | | 705/26.3 |
| 2014/0236678 A1* | 8/2014 | Akerman | G06F 16/9537 |
| | | | 705/7.34 |
| 2015/0081349 A1* | 3/2015 | Johndrow | G06Q 20/3224 |
| | | | 705/5 |
| 2015/0269617 A1* | 9/2015 | Mikurak | G06Q 50/12 |
| | | | 705/14.54 |
| 2015/0348083 A1* | 12/2015 | Brill | G06Q 20/386 |
| | | | 705/14.23 |
| 2016/0371692 A1* | 12/2016 | Clyne | G06Q 30/0255 |
| 2018/0075385 A1* | 3/2018 | Condon | G06Q 10/0637 |
| 2018/0308105 A1* | 10/2018 | Fordyce, III | G06Q 30/02 |
| 2018/0374011 A1* | 12/2018 | Barr | G06Q 10/0633 |
| 2019/0325465 A1* | 10/2019 | Newman | G06Q 30/0205 |

* cited by examiner

INVENTORY MANAGEMENT SYSTEM

BACKGROUND INFORMATION

1. Field

The present disclosure relates generally to an improved computer system and, in particular, to a method and apparatus for accessing information in a computer system. Still more particularly, the present disclosure relates to a method, a system, and a computer program product for determining and presenting a potentially competitive resource allocation for an organization.

2. Background

A retail business needs to manage its supply chain of products. In one aspect, computer applications are used to manage inventory of products and determine demand forecasts. In the retail industry, a replenishment process is followed to decide how much product to order and when to order the product to ensure that there is enough inventory in store to satisfy customer demand.

Normally, the current inventory level for a product or item is compared against some defined threshold level of inventory. If the current level of the inventory is less than the threshold level, an order will be placed. The level to which the inventory is to be increased by placing an order may be defined as well. The amount of product to be ordered (the order quantity) is simply the difference between the level to which the inventory is to be increased and the threshold level of inventory. However, current inventory management systems lack the ability to account for changing economic conditions within a particular geographic region when filling inventory.

Therefore, it would be desirable to have a method and apparatus that take into account at least some of the issues discussed above, as well as other possible issues. For example, it would be desirable to have a method and apparatus that overcome the technical problem of accounting for changing economic conditions within a particular geographic region when filling inventory.

SUMMARY

An embodiment of the present disclosure provides a method for managing inventory for an organization. A computer system identifies human resources data regarding employees of organizations. The human resources data comprises geolocation data based at least partially on a geolocation of the organization and geolocations of the employees. The computer system determines a change in market dynamics relating to a set of geographic regions based at least partially on the human resources data. The computer system identifies transaction data for transactions involving a business-merchant within a particular geographic region and a consumer. The computer system generates a suggested inventory for the business-merchant. The suggested inventory is based at least partially on the determined change in market dynamics for the set of geographic regions in the transaction data for the business merchant.

Another embodiment of the present disclosure provides a computer system comprising a display system, a hardware processor, and an inventory management system in communication with the display system and the hardware processor. An inventory manager of the inventory management system is configured to identify human resources data regarding employees of organizations. The human resources data comprises geolocation data based at least partially on a geolocation of the organization and geolocations of the employees. The inventory manager is configured to determine a change in market dynamics relating to a set of geographic regions based at least partially on the human resources data. The inventory manager is configured to identify transaction data for transactions involving a business-merchant within a particular geographic region and a consumer. Inventory manager is configured to generate a suggested inventory for the business-merchant. The suggested inventory is based at least partially on the determined change in market dynamics for the set of geographic regions in the transaction data for the business merchant.

Yet another embodiment of the present disclosure provides a computer program product for managing inventory for an organization. The computer program product comprises a computer readable storage media and program code, stored on the computer readable storage media. The program code includes program code for identifying human resources data regarding employees of organizations. The human resources data comprises geolocation data based at least partially on a geolocation of the organization and geolocations of the employees. The program code includes program code for determining a change in market dynamics relating to a set of geographic regions based at least partially on the human resources data. The program code includes program code for identifying transaction data for transactions involving a business-merchant within a particular geographic region and a consumer. The program code includes program code for generating a suggested inventory for the business-merchant. The suggested inventory is based at least partially on the determined change in market dynamics for the set of geographic regions in the transaction data for the business merchant.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

DETAILED DESCRIPTION

The illustrative embodiments recognize and take into account one or more different considerations. For example, the illustrative embodiments recognize and take into account that information about economic conditions within a particular geographic region may be beneficial to a business merchant when filling inventory. Furthermore, identifying timely information regarding changing economic conditions within a particular region may be more cumbersome and time-consuming than desirable.

The illustrative embodiments also recognize and take into account that digitally presenting a suggested inventory based on identified market dynamics may allow business merchants to offer different products in a manner that more accurately reflects the economic realities in particular geographic regions.

Thus, the illustrative embodiments provide a method and apparatus for digitally presenting a potentially competitive resource allocation for an organization. In one illustrative example, a computer system identifies human resources data regarding employees of organizations. The human resources data comprises geolocation data based at least partially on a geolocation of the organization and geolocations of the employees. The computer system determines a change in market dynamics relating to a set of geographic regions based at least partially on the human resources data. The computer system identifies transaction data for transactions involving a business merchant within a particular geographic region and a consumer. The computer system generates a suggested inventory for the business merchant. The suggested inventory is based at least partially on the determined change in market dynamics for the set of geographic regions in the transaction data for the business merchant.

Figure 1:
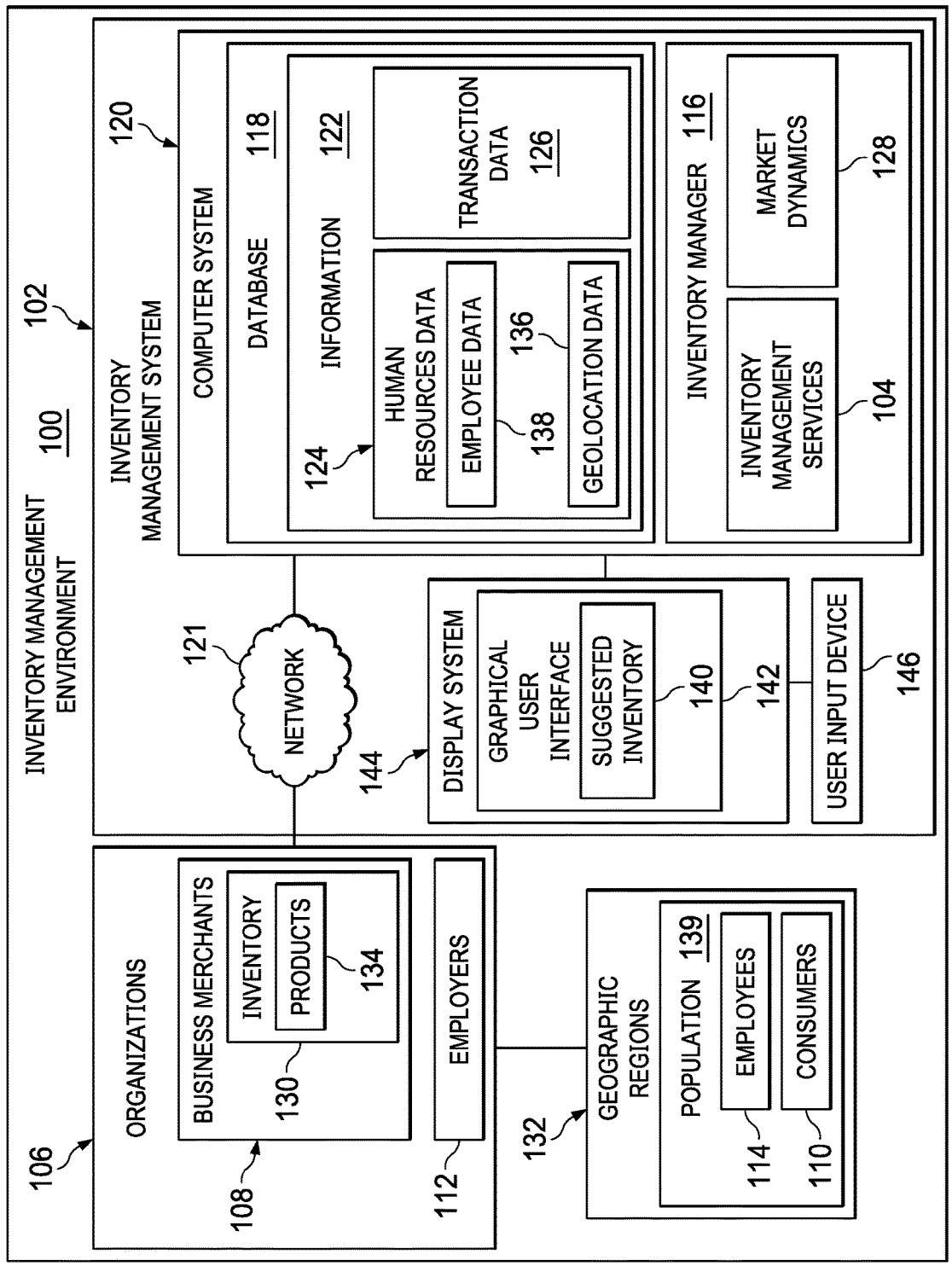
FIG. 1 is an illustration of a block diagram of an inventory management environment in accordance with an illustrative embodiment.

With reference now to the figures and, in particular, with reference to FIG. 1, an illustration of a block diagram of an inventory management environment is depicted in accordance with an illustrative embodiment. In this illustrative example, inventory management environment 100 includes inventory management system 102. Inventory management system 102 provides inventory management services 104 to one or more of organizations 106. Organizations 106 may be, for example, a corporation, a partnership, a charitable organization, a business entity, a city, a government agency, or some other suitable type of organization.

Organization 106 may operate in a number of different roles. As used herein, "a number of" means one or more different components. For example, organizations 106 may operate as at least one of business merchants 108, providing at least one of goods and services to consumers 110, and employers 112, providing employment to employees 114. As used herein, consumers 110 and employees 114 establish population 139 for each of geographic regions 132.

As used herein, the phrase "at least one of," when used with a list of items, means different combinations of one or more of the listed items may be used and only one of each item in the list may be needed. In other words, "at least one of" means any combination of items and number of items may be used from the list, but not all of the items in the list are required. The item may be a particular object, thing, or a category.

For example, without limitation, "at least one of item A, item B, or item C" may include item A, item A and item B, or item B. This example also may include item A, item B, and item C or item B and item C. Of course, any combinations of these items may be present. In some illustrative examples, "at least one of" may be, for example, without limitation, two of item A; one of item B; and ten of item C; four of item B and seven of item C; or other suitable combinations.

As used herein, the term "business merchant" refers to any individual or any business or non-business entity that sells, distributes, trades or otherwise deals, either as a retailer or wholesaler, in goods and/or services. Business merchants can be individuals or business or non-business entities that actually produce/provide the goods and/or services being sold. Business merchants can be individuals or business or non-business entities that distribute the goods and/or services but do not produce/provide the goods and/or services.

As used herein, the term "consumer" refers to any individual or any business or non-business entity that buys or otherwise acquires goods and/or services from a business merchant.

In this illustrative example, inventory management system 102 includes a number of different components. As depicted, inventory management system 102 includes inventory manager 116 and database 118.

Inventory manager 116 and database 118 may be implemented in computer system 120. Computer system 120 is a physical hardware system and includes one or more data processing systems. When more than one data processing system is present, those data processing systems may be in communication with each other using a communications medium. The communications medium may be a network, such as network 121. The data processing systems may be selected from at least one of a computer, a server computer, a workstation, a tablet computer, a laptop computer, a mobile phone, or some other suitable data processing system.

In this illustrative example, inventory manager 116 provides inventory management services 104 to business merchants 108 based on information 122 in database 118. By providing inventory management services 104 based on information 122, inventory manager 116 enables the management of inventory 130 in a manner that more accurately reflects changes in market dynamics 128 within given geographic regions 132. For example, providing inventory management services 104 based on market dynamics 128 identified from human resources data 124 allows business merchants 108 to offer different ones of products 134 in a manner that more accurately reflects the economic realities in particular ones of geographic regions 132.

Inventory manager 116 may be implemented in software, hardware, firmware, or a combination thereof. When software is used, the operations performed by inventory manager 116 may be implemented in program code configured to run on hardware, such as a processor unit. When firmware is used, the operations performed by inventory manager 116 may be implemented in program code and data and stored in persistent memory to run on a processor unit. When hardware is employed, the hardware may include circuits that operate to perform the operations in inventory manager 116.

In the illustrative examples, the hardware may take the form of a circuit system, an integrated circuit, an application-specific integrated circuit (ASIC), a programmable logic device, or some other suitable type of hardware configured to perform a number of operations. With a programmable logic device, the device may be configured to perform the number of operations. The device may be reconfigured at a later time or may be permanently configured to perform the number of operations. Programmable logic devices include, for example, a programmable logic array, programmable array logic, a field programmable logic array, a field programmable gate array, and other suitable hardware devices. Additionally, the processes may be implemented in organic components integrated with inorganic components and may be comprised entirely of organic components, excluding a human being. For example, the processes may be implemented as circuits in organic semiconductors.

Database 118 is a network storage device capable of storing any type of data in a structured format or an unstructured format. In addition, database 118 may represent a plurality of network storage devices. Further, database 118 may store identifiers for a plurality of client device users, profiles for the plurality of client device users, file access trends by the plurality of client device users, activities performed by the plurality of client device users after accessing files, and the like. Furthermore, database 118 may store other types of data, such as authentication or credential data that may include usernames, passwords, and biometric data associated with the plurality of client device users and system administrators, for example.

Database 118 includes information 122. Information 122 can include information about organizations 106. Information 122 about organizations 106 may include, for example, at least one of information about people, products, research, product analysis, business plans, financials, or other information relating to organizations 106. As depicted, information 122 includes human resources data 124 and transaction data 126.

As used herein, human resources data 124 is information used to perform human resources operations for employees 114. For example, human resources data 124 may include data that is used to process payroll to generate paychecks for employees 114 of organizations 106. Additionally, human resources data 124 may include data that is used by human resources departments of organizations 106 to maintain benefits and other records about employees 114.

As used herein, transaction data 126 is information relating to the sale of a good and/or service. For example, transaction data 126 includes information about business merchants 108, consumers 110, and the good(s) and/or service(s) exchanged between consumers 110 and business merchants 108 during transactions. For example, transaction data 126 can include a description of the good(s) and/or service(s), the quantity of good(s) and/or service(s), and the price of the good(s) and/or service(s).

In this illustrative example, inventory manager 116 provides a method for managing inventory 130. Inventory manager 116 provides inventory management services 104 to business merchants 108 based at least in part on market dynamics 128 determined from human resources data 124. By providing inventory management services 104 based on human resources data 124, inventory manager 116 enables the management of inventory 130 in a manner that more accurately reflects changes in market dynamics 128 within given geographic regions 132. For example, providing inventory management services 104 based on market dynamics 128 identified from human resources data 124 allows business merchants 108 to offer different ones of products 134 in a manner that more accurately reflects the economic realities in particular ones of geographic regions 132.

Inventory manager 116 identifies human resources data 124 regarding employees 114 of organizations 106. Human resources data 124 comprises geolocation data 136. Geolocation data 136 is data indicating geographic regions 132 in which population 139 is located. Geographic regions 132 can be, for example, but not limited to, a country, a time zone, a state, a region, a metropolitan area, a city, a zip code, a subdivision, a neighborhood, or a street.

In one illustrative example, geolocation data 136 can be identified from employee data 138. Employee data 138 can include, for example, but not limited to, a social security number, a date of birth, a name, an address, a telephone number, a driver's license number, and a professional license number, as well as possibly other information that can be used to identify geolocation data 136 of employees 114.

Inventory manager 116 determines a change in market dynamics 128 relating to a set of geographic regions 132 based at least partially on human resources data 124. Generally, market dynamics 128 are pricing signals that are created as a result of changing supply and demand levels of products and services in a given market. For example, changes in market dynamics 128 include population movement to and from the geographic region, changes in affluence of consumers living in the geographic region, and variations in economic stress in the geographic region. Consumer behavior in a geographic region reflects market dynamics 128 of that geographic region.

In this illustrative example, employee data 138 may include personal financial information for employees 114. For example, employee data 138 may include at least one of payroll information, tax information, salary information, a social security number, or other types of personal financial information of employees 114.

Changes in market dynamics 128 often correspond to trends in consumer behavior. If a change is occurring in market dynamics 128 of a geographic region, then a corresponding consumer behavior trend predictably develops in that geographic region. By identifying changes in human resources data 124, inventory manager 116 can determine market dynamics 128 in a specific one of geographic regions 132. In this manner, inventory manager 116 can predict particular trends in consumer behavior within a geographic region, allowing business merchants 108 to proactively adapt inventory 130 based on emerging changes identified in market dynamics 128.

Inventory manager 116 identifies transaction data 126 for transactions involving business merchants 108 within a particular one of geographic regions 132 and consumers 110. The transactions may involve a sale of products 134 that depletes inventory 130 of business merchants 108. Inventory manager 116 then generates suggested inventory 140 for business merchants 108 based at least partially on the determined change in market dynamics 128 of the set of geographic regions 132 and transaction data 126 for business merchants 108.

Inventory manager 116 graphically displays suggested inventory 140 to business merchants 108. In this illustrative example, suggested inventory 140 can then be displayed in graphical user interface 142 on display system 144 in inventory management system 102, and relied upon when replenishing inventory 130 for business merchants 108.

As depicted, display system 144 is a physical hardware system and includes one or more display devices. The display devices may include at least one of a light emitting diode (LED) display, a liquid crystal display (LCD), an organic light emitting diode (OLED) display, or some other suitable display device.

An operator may interact with graphical user interface 142 through user input generated by user input device 146. User input device 146 may be, for example, a mouse, a keyboard, a trackball, a touchscreen, a stylus, or some other suitable type of input device.

The illustrative example in FIG. 1 and the examples in the other subsequent figures provide one or more technical solutions to overcome a technical problem of managing inventory for organizations in a manner that more accurately reflects to the changing economic realities in particular geographic regions more cumbersome and time-consuming than desired. For example, inventory manager 116 identifies human resources data 124 regarding employees 114 of organizations 106. Human resources data 124 comprises geolocation data 136 based at least partially on a geographic location of organizations 106 and geographic locations of employees 114. Inventory manager 116 determines a change in market dynamics 128 relating to a set of geographic regions 132 based at least partially on human resources data 124. Inventory manager 116 identifies transaction data 126 for transactions involving business merchants 108 within a particular one of geographic regions 132 and consumers 110. Inventory manager 116 then generates suggested inventory 140 for business merchants 108 based at least partially on the determined change in market dynamics 128 of the set of geographic regions 132 and transaction data 126 for business merchants 108, and graphically displays suggested inventory 140 to business merchants 108.

In this manner, the use of inventory management system 102 has a technical effect of determining suggested inventory 140 for organizations 106 based on market dynamics 128 identified from human resources data 124. Suggested inventory 140 determined in this manner allows business merchants 108 to offer different ones of products 134 that more accurately reflect the economic realities in particular ones of geographic regions 132. In this manner, inventory replenishing operations performed for organization 106 may be performed more efficiently as compared to currently used inventory management systems that do not include inventory manager 116.

As a result, computer system 120 operates as a special purpose computer system in which inventory manager 116 in computer system 120 enables determining of suggested inventory 140 for organizations 106 in particular ones of geographic regions 132 based on market dynamics 128 identified from human resources data 124. For example, changes in market dynamics 128 often correspond to trends in consumer behavior. If a change is occurring in market dynamics 128 of a geographic region, then a corresponding consumer behavior trend predictably develops in that geographic region. By identifying changes in human resources data 124, inventory manager 116 can determine market dynamics 128 in a specific one of geographic regions 132. In this manner, inventory manager 116 can predict particular trends in consumer behavior within a geographic region, allowing business merchants 108 to proactively adapt inventory 130 based on emerging changes identified in market dynamics 128.

Thus, inventory manager 116 transforms computer system 120 into a special purpose computer system as compared to currently available general computer systems that do not have inventory manager 116. Currently used general computer systems do not enable determining of suggested inventory 140 for organizations 106 in particular ones of geographic regions 132 based on market dynamics 128 identified from human resources data 124. Further, currently used general computer systems do not predict particular trends in consumer behavior within a geographic region, allowing business merchants 108 to proactively adapt inventory 130 based on emerging changes identified in market dynamics 128.

Figure 2:
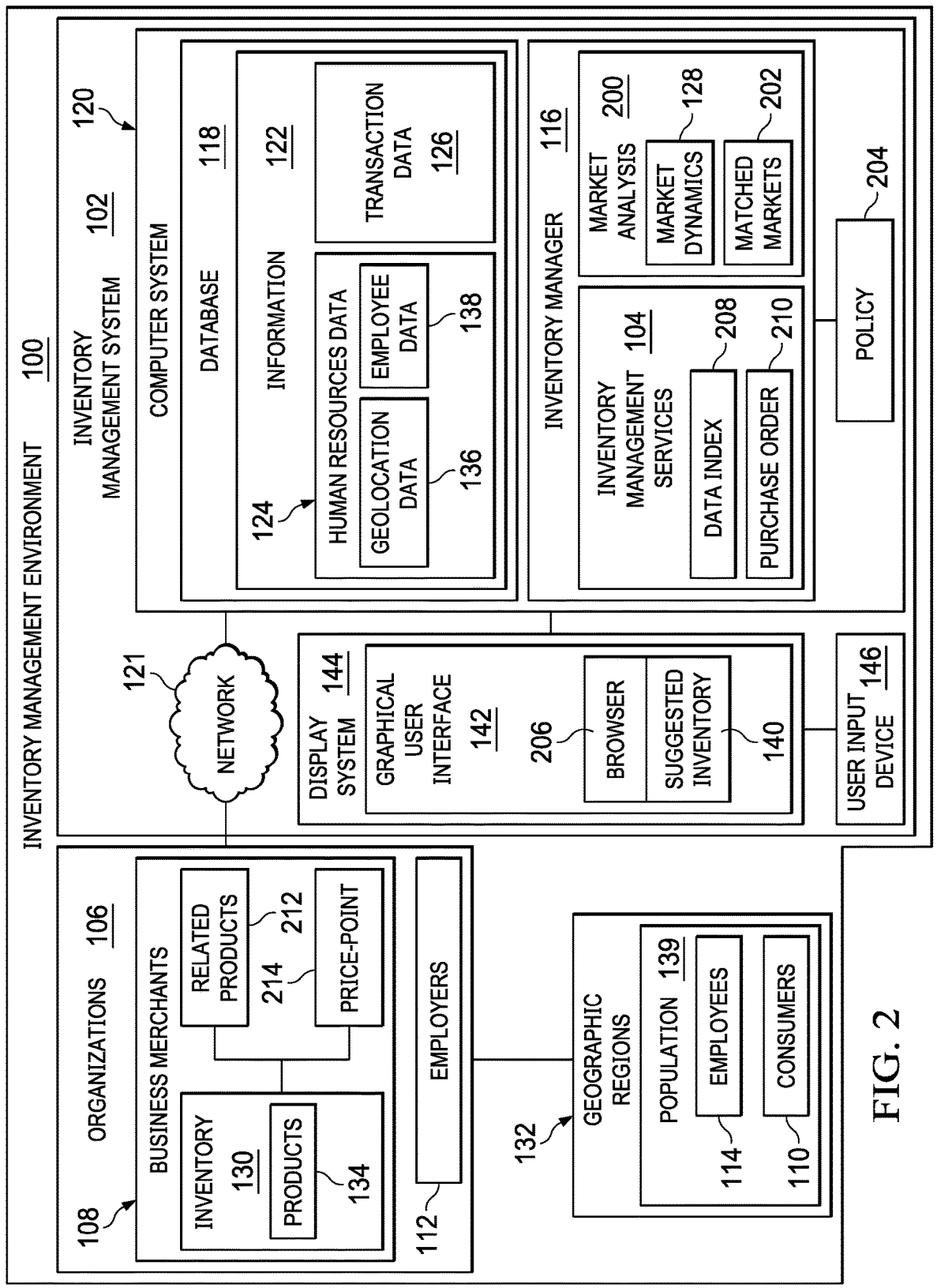
FIG. 2 is an illustration of a block diagram of a data flow for managing inventory in accordance with an illustrative embodiment.

With reference next to FIG. 2, an illustration of a block diagram of a data flow for managing inventory is depicted in accordance with an illustrative embodiment. In this illustrative example, inventory manager 116 includes a number of different components. As depicted, inventory manager 116 includes inventory management services 104 and market analysis 200.

In this illustrative example, inventory manager 116 provides inventory management services 104 as a service to organizations 106. Organizations 106 can access inventory management services 104 by, for example, using browser 206 displayed in graphical user interface 142 on display system 144. In this illustrative example, inventory manager 116 is provided as a service to organizations 106 to facilitate management of inventory 130.

In this illustrative example, inventory manager 116 generates purchase order 210 for inventory 130 of business merchants 108 based on suggested inventory 140. Purchase order 210 is a document that authorizes a purchase transaction by business merchants 108. In this illustrative example, purchase order 210 is an order for related products 212.

As used herein, the term "related products" are products that can be substituted for and can be used instead of another. Related products 212 are products that consumers 110 perceive as similar or comparable to products 134.

In one illustrative example, products 134 may be associated with a different one of price point 214 than related products 212. Changes in market dynamics 128 may increase for related products 212 among consumers 110 in a particular ones of geographic regions 132. Related products 212 associated with suggested inventory 140 can therefore be at least one of an upsell, a down-sell, or a cross-sell in relation to products 134 associated with the previous transactions.

In this illustrative example, inventory manager 116 determines related products 212 using policy 204. In this illustrative example, policy 204 includes a group of rules that are used to related products 212 for products 134 based on changes in market dynamics 128. Policy 204 also may include data used to apply a group of rules.

For example, one rule in policy 204 may specify related products 212 that are an upsell in relation to products 134. Inventory manager 116 may apply this rule based on a positive change in market dynamics 128.

Another rule in policy 204 may specify related products 212 that are a down-sell in relation to products 134. Inventory manager 116 may apply this rule based on a negative change in market dynamics 128.

In one illustrative example, inventory manager 116 determines suggested inventory 140 based on matched markets 202. Matched markets 202 are similar ones of geographic regions 132. In one illustrative example, market analysis 200 identifies matched markets 202 using policy 204.

For example, one or more rules in policy 204 may determine matched markets 202 among geographic regions 132 based on similarities among human resources data 124 associated with geographic regions 132. Inventory manager 116 generates suggested inventory 140 for business merchants 108 based at least partially on the determined change in market dynamics 128 of matched markets 202 and transaction data 126 for business merchants 108.

In one illustrative example, inventory management services 104 can further include data index 208. Data index 208 is an indexing tool provided for indexing human resources data 124 by geolocation data 136. This indexing makes human resources data 124 searchable by geographic regions 132.

In this illustrative example, data index 208 indexes human resources data 124 to geolocation data 136 to provide human resources data 124 that is searchable by geolocation data 136. Inventory manager 116 can then provide a search tool, such as in browser 206, associated with the indexed human resources data 124, thereby enabling a user accessing inventory management services 104 to search the indexed human resources data 124 by geolocation data 136.

For example, inventory manager 116 receives an instruction that defines one of geographic regions 132. The instruction can be received from one of business merchants 108, accessing inventory management services 104 through browser 206.

In response to receiving the instruction, inventory manager 116 then determines the change in market dynamics 128. Inventory manager 116 searches the indexed human resources data 124 to identify human resources data 124 for employees 114 of organizations 106. In this illustrative example, at least one of the geographic location of organizations 106 and the geographic locations of employees 114 is within the particular one of geographic regions 132, as indicated by geolocation data 136.

Inventory manager 116 identifies the change in market dynamics 128 for the particular one of geographic regions 132 based on an aggregate change in human resources data 124 for employees 114 of organizations 106 in matched markets 202.

Figure 3:
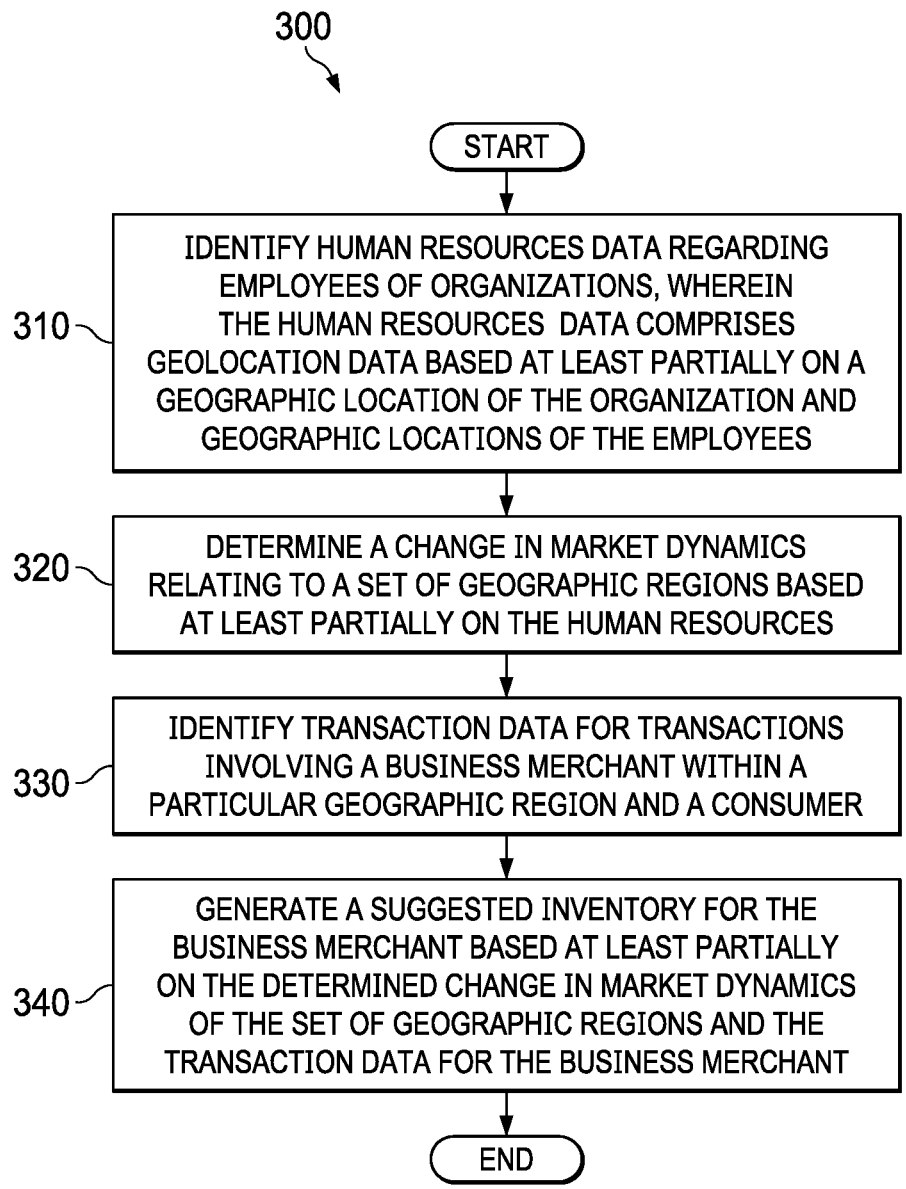
FIG. 3 is an illustration of a flowchart of a method for managing inventory in accordance with an illustrative embodiment.

With reference next to FIG. 3, an illustration of a flowchart of a method for managing inventory is depicted in accordance with an illustrative embodiment. The process in FIG. 3 may be implemented in inventory management system 102 shown in block form in FIG. 1.

Process 300 begins by identifying human resources data regarding employees of organizations, wherein the human resources data comprises geolocation data based at least partially on a geographic location of the organization and geographic locations of the employees (step 310). The human resources data can be human resources data 124 regarding employees 114 of organizations 106, all shown in block form in FIGS. 1-2.

The process determines a change in market dynamics relating to a set of geographic regions based at least partially on the human resources data (step 320). The market dynamics can be market dynamics 128 for geographic regions 132, both shown in block form in FIGS. 1-2.

The process identifies transaction data for transactions involving a business merchant within a particular geographic region and a consumer (step 330). The transaction data can be transaction data 126 for transactions between business merchant 108 and consumers 110 within the particular one of geographic regions 132, all shown in block form in FIGS. 1-2.

The process generates a suggested inventory for the business merchant based at least partially on the determined change in market dynamics of the set of geographic regions and the transaction data for the business merchant (step 340), with the process terminating thereafter. The suggested inventory can be suggested inventory 140 shown in block form in FIGS. 1-2. In this manner, process 300 enables business merchants 108 to proactively adapt inventory 130 based on predicted particular trends in consumer behavior within a geographic region, identified from emerging changes in market dynamics 128.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent at least one of a module, a segment, a function, or a portion of an operation or step. For example, one or more of the blocks may be implemented as program code, hardware, or a combination of the program code and hardware. When implemented in hardware, the hardware may, for example, take the form of integrated circuits that are manufactured or configured to perform one or more operations in the flowcharts or block diagrams. When implemented as a combination of program code and hardware, the implementation may take the form of firmware. Each block in the flowcharts or the block diagrams may be implemented using special purpose hardware systems that perform the different operations or combinations of special purpose hardware and program code run by the special purpose hardware.

In some alternative implementations of an illustrative embodiment, the function or functions noted in the blocks may occur out of the order noted in the figures. For example, in some cases, two blocks shown in succession may be performed substantially concurrently, or the blocks may sometimes be performed in the reverse order, depending upon the functionality involved. Also, other blocks may be added in addition to the illustrated blocks in a flowchart or block diagram.

Figure 4:
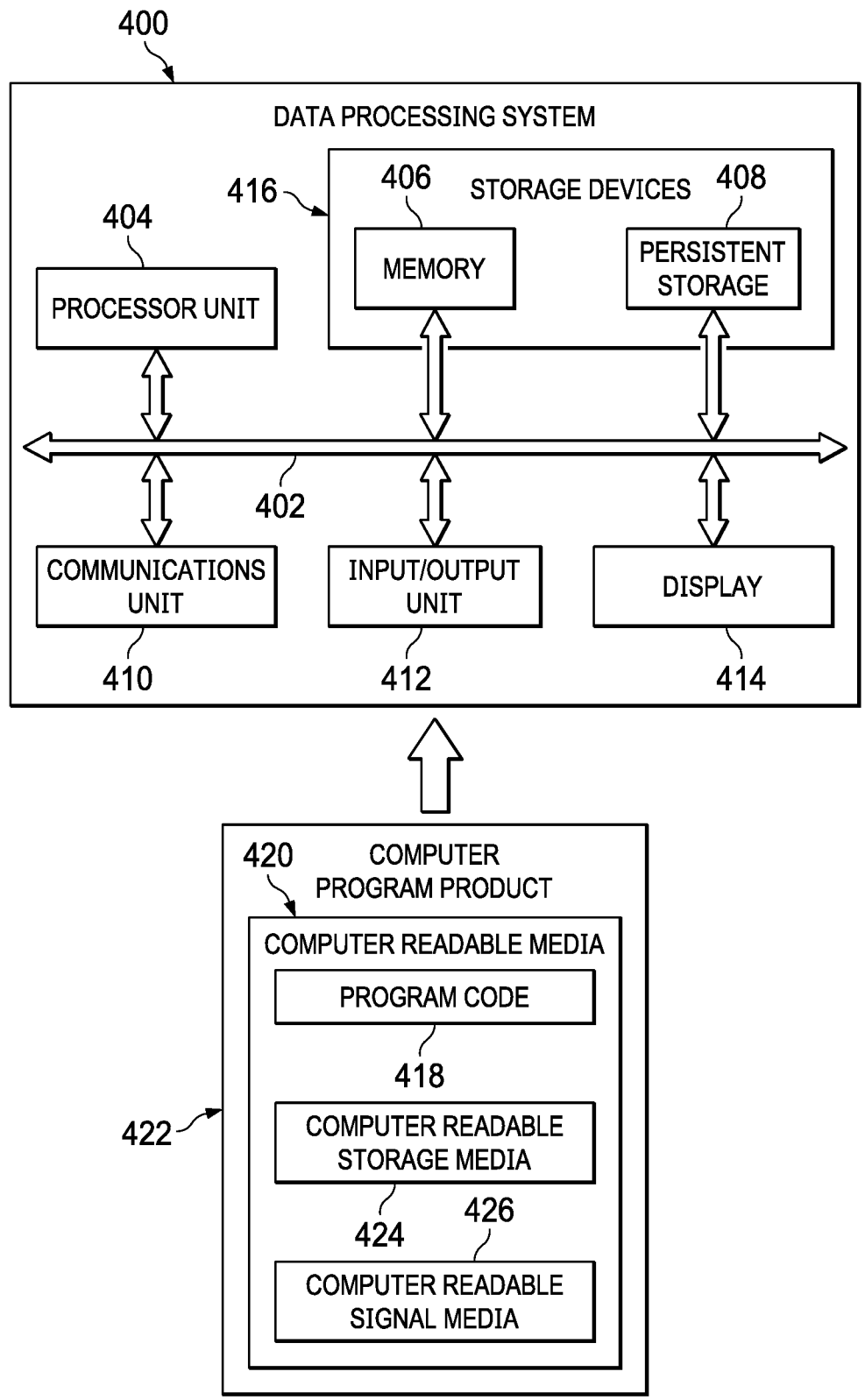
FIG. 4 is an illustration of a block diagram of a data processing system in accordance with an illustrative embodiment.

Turning now to FIG. 4, an illustration of a block diagram of a data processing system is depicted in accordance with an illustrative embodiment. Data processing system 400 may be used to implement one or more of inventory management system 102, and computer system 120, shown in block form in FIG. 1. In this illustrative example, data processing system 400 includes communications framework 402, which provides communications between processor unit 404, memory 406, persistent storage 408, communications unit 410, input/output (I/O) unit 412, and display 414. In this example, communications framework 402 may take the form of a bus system.

Processor unit 404 serves to execute instructions for software that may be loaded into memory 406. Processor unit 404 may be a number of processors, a multi-processor core, or some other type of processor, depending on the particular implementation.

Memory 406 and persistent storage 408 are examples of storage devices 416. A storage device is any piece of hardware that is capable of storing information, such as, for example, without limitation, at least one of data, program code in functional form, or other suitable information either on a temporary basis, a permanent basis, or both on a temporary basis and a permanent basis. Storage devices 416 may also be referred to as computer readable storage devices in these illustrative examples. Memory 406, in these examples, may be, for example, a random-access memory or any other suitable volatile or non-volatile storage device. Persistent storage 408 may take various forms, depending on the particular implementation.

For example, persistent storage 408 may contain one or more components or devices. For example, persistent storage 408 may be a hard drive, a solid state hard drive, a flash memory, a rewritable optical disk, a rewritable magnetic tape, or some combination of the above. The media used by persistent storage 408 also may be removable. For example, a removable hard drive may be used for persistent storage 408.

Communications unit 410, in these illustrative examples, provides for communications with other data processing systems or devices. In these illustrative examples, communications unit 410 is a network interface card.

Input/output unit 412 allows for input and output of data with other devices that may be connected to data processing system 400. For example, input/output unit 412 may provide a connection for user input through at least one of a keyboard, a mouse, or some other suitable input device. Further, input/output unit 412 may send output to a printer. Display 414 provides a mechanism to display information to a user.

Instructions for at least one of the operating system, applications, or programs may be located in storage devices 416, which are in communication with processor unit 404 through communications framework 402. The processes of the different embodiments may be performed by processor unit 404 using computer-implemented instructions, which may be located in a memory, such as memory 406.

These instructions are referred to as program code, computer usable program code, or computer readable program code that may be read and executed by a processor in processor unit 404. The program code in the different embodiments may be embodied on different physical or computer readable storage media, such as memory 406 or persistent storage 408.

Program code 418 is located in a functional form on computer readable media 420 that is selectively removable and may be loaded onto or transferred to data processing system 400 for execution by processor unit 404. Program code 418 and computer readable media 420 form computer program product 422 in these illustrative examples. In one example, computer readable media 420 may be computer readable storage media 424 or computer readable signal media 426.

In these illustrative examples, computer readable storage media 424 is a physical or tangible storage device used to store program code 418 rather than a medium that propagates or transmits program code 418.

Alternatively, program code 418 may be transferred to data processing system 400 using computer readable signal media 426. Computer readable signal media 426 may be, for example, a propagated data signal containing program code 418. For example, computer readable signal media 426 may be at least one of an electromagnetic signal, an optical signal, or any other suitable type of signal. These signals may be transmitted over at least one of communications links, such as wireless communications links, optical fiber cable, coaxial cable, a wire, or any other suitable type of communications link.

The different components illustrated for data processing system 400 are not meant to provide architectural limitations to the manner in which different embodiments may be implemented. The different illustrative embodiments may be implemented in a data processing system including components in addition to or in place of those illustrated for data processing system 400. Other components shown in FIG. 4 can be varied from the illustrative examples shown. The different embodiments may be implemented using any hardware device or system capable of running program code 418.

Thus, the illustrative embodiments provide a method, an apparatus, and a computer program product for managing inventory based on changes in market dynamics identified from human resources data. The illustrative examples described herein provide one or more technical solutions to overcome a technical problem of managing inventory for organizations in a manner that more accurately reflects the changing economic realities in particular geographic regions. For example, inventory manager 116 identifies human resources data 124 regarding employees 114 of organizations 106. Human resources data 124 comprises geolocation data 136 based at least partially on a geographic location of organizations 106 and geographic locations of employees 114. Inventory manager 116 determines a change in market dynamics 128 relating to a set of geographic regions 132 based at least partially on human resources data 124. Inventory manager 116 identifies transaction data 126 for transactions involving business merchants 108 within a particular one of geographic regions 132 and consumer 110. Inventory manager 116 then generates suggested inventory 140 for business merchant 108 based at least partially on the determined change in market dynamics 128 of the set of geographic regions 132 and transaction data 126 for business merchants 108, and graphically displays suggested inventory 140 to business merchants 108.

In this manner, the use of inventory management system 102 has a technical effect of determining suggested inventory 140 for organizations 106 based on market dynamics 128 identified from human resources data 124. Suggested inventory 140 determined in this manner allows business merchants 108 to offer different ones of products 134 that more accurately reflect to the economic realities in particular ones of geographic regions 132. In this manner, inventory replenishing operations performed for organization 106 may be performed more efficiently as compared to currently used inventory management systems that do not include inventory manager 116.

As a result, computer system 120 operates as a special purpose computer system in which inventory manager 116 in computer system 120 enables determining of suggested inventory 140 for organizations 106 in particular ones of geographic regions 132 based on market dynamics 128 identified from human resources data 124. For example, changes in market dynamics 128 often correspond to trends in consumer behavior. If a change is occurring in market dynamics 128 of a geographic region, then a corresponding consumer behavior trend predictably develops in that geographic region. By identifying changes in human resources data 124, inventory manager 116 can determine market dynamics 128 in a specific one of geographic regions 132. In this manner, inventory manager 116 can predict particular trends in consumer behavior within a geographic region, allowing business merchants 108 to proactively adapt inventory 130 based on emerging changes identified in market dynamics 128.

Thus, inventory manager 116 transforms computer system 120 into a special purpose computer system as compared to currently available general computer systems that do not have inventory manager 116. Currently used general computer systems do not enable determining of suggested inventory 140 for organizations 106 in particular ones of geographic regions 132 based on market dynamics 128 identified from human resources data 124. Further, currently used general computer systems do not predict particular trends in consumer behavior within a geographic region, allowing business merchants 108 to proactively adapt inventory 130 based on emerging changes identified in market dynamics 128.

The different illustrative examples describe components that perform actions or operations. In an illustrative embodiment, a component may be configured to perform the action or operation described. For example, the component may have a configuration or design for a structure that provides the component an ability to perform the action or operation that is described in the illustrative examples as being performed by the component.

Many modifications and variations will be apparent to those of ordinary skill in the art. Further, different illustrative embodiments may provide different features as compared to other desirable embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method for managing inventory, the method comprising:
identifying, using inventory management services of an inventory manager of a computer system, payroll data regarding employees of organizations, wherein the payroll data comprises geographic location data based at least partially on a geographic location of the organization and geographic locations of the employees;
determining, using market analysis of the inventory manager of the computer system, a change in market dynamics relating to a set of geographic regions based at least partially on the payroll data;
identifying, using the market analysis of the inventory manager of the computer system, transaction data for transactions involving a business merchant within a particular geographic region and an individual consumer;
generating, using the inventory management services of the inventory manager of the computer system, a suggested inventory for the business merchant based at least partially on the determined change in market dynamics relating to the set of geographic regions, the transaction data for the business merchant and predicted particular trends in consumer behavior within the set of geographic regions identified from emerging changes in market dynamics;
graphically displaying, using a graphical user interface of a display system of an inventory management system, the suggested inventory to the business merchant;
replenishing an inventory for the business merchant, using the inventory management services of the inventory manager of the computer system, by performing inventory replenishing operations relying upon the suggested inventory;
generating, automatically by the computer system, a purchase order for inventory of the business merchant based on the suggested inventory;
indexing, using a data index indexing tool of inventory management services of the inventory manager of the computer system, the payroll data by the geographic location data to provide indexed payroll data that is searchable by the geographic location data; and
providing, using the inventory management services of the inventory manager of the computer system, a search tool associated with the indexed payroll data, the search tool being in a browser of the graphical user interface of the display system and useable by a user accessing inventory management services of the inventory manager, using a user input device, to search the indexed payroll data by the geographic location data.

2. The method of claim 1, wherein products associated with the transactions have a different price point than products associated with the suggested inventory.

3. The method of claim 2, wherein the products associated with the suggested inventory are a down-sell, in relation to the products associated with the transactions.

4. The method of claim 1 further comprising:
identifying, by the computer system, a matched market for the particular geographic region from the set of geographic regions; and
wherein generating the suggested inventory further comprises:
generating, by the computer system, the suggested inventory for the business merchant based at least partially on the matched market and the transaction data for the business merchant.

5. The method of claim 1 further comprising:
receiving, by the computer system, an instruction that defines the particular geographic region.

6. The method of claim 5, wherein determining the change in market dynamics further comprises:
searching, by the computer system, the indexed payroll data to identify the payroll data for the employees of the organizations, wherein at least one of the geographic location of the organization and geographic locations of the employees is within the particular geographic region; and
identifying, by the computer system, the change in market dynamics for the particular geographic region based on an aggregate change in the payroll data for the employees of the organizations.

7. The method of claim 3, further comprising:
identifying, by the computer system, a matched market for the particular geographic region from the set of geographic regions; and
wherein generating the suggested inventory further comprises:
generating, by the computer system, the suggested inventory for the business merchant based at least partially on the matched market and the transaction data for the business merchant.

8. A computer system comprising:
a display system including a graphical user interface;
a hardware processor; and
an inventory manager in communication with the display system and the hardware processor, wherein the inventory manager i) includes inventory management services and market analysis and ii) is configured:
to, using the inventory management services of the inventory manager, identify payroll data regarding employees of organizations, wherein the payroll data comprises geographic location data based at least partially on a geographic location of the organization and geographic locations of the employees;
to, using the market analysis of the inventory manager, determine a change in market dynamics relating to a set of geographic regions based at least partially on the payroll data;
to, using the market analysis of the inventory manager, identify transaction data for transactions involving a business merchant within a particular geographic region and an individual consumer;
to, using the inventory management services of the inventory manager, generate a suggested inventory for the business merchant based at least partially on the determined change in market dynamics relating to the set of geographic regions, the transaction data for the business merchant and predicted particular trends in consumer behavior within the set of geographic regions identified from emerging changes in market dynamics;
to, using the inventory management services of the inventory manager, replenish an inventory business merchant by performing inventory replenishing operations relying upon the suggested inventory;

to generate automatically a purchase order for inventory of the business merchant based on the suggested inventory;

to index, using a data index indexing tool of inventory management services of the inventory manager of the computer system, the payroll data by the geographic location data to provide indexed payroll data that is searchable by the geographic location data; and to provide, using the inventory management services of the inventory manager of the computer system, a search tool associated with the indexed payroll data, the search tool being in a browser of the graphical user interface of the display system and useable by a user accessing inventory management services of the inventory manager, using a user input device, to search the indexed payroll data by the geographic location data, wherein the graphical user interface of the display system graphically displays the suggested inventory to the business merchant.

9. The computer system of claim 8, wherein products associated with the transactions have a different price point than products associated with the suggested inventory.

10. The computer system of claim 9, wherein the products associated with the suggested inventory are a down-sell, in relation to the products associated with the transactions.

11. The computer system of claim 8, wherein the inventory manager is further configured:

to identify a matched market for the particular geographic region from the set of geographic regions; and wherein generating the suggested inventory further comprises:

generating the suggested inventory for the business merchant based at least partially on the matched market and the transaction data for the business merchant.

12. The computer system of claim 8, wherein the inventory manager is further configured:

to receive an instruction that defines the particular geographic region.

13. The computer system of claim 12, wherein in determining the change in market dynamics further comprises:

searching the indexed payroll data to identify the payroll data for the employees of the organizations, wherein at least one of the geographic location of the organization and geographic locations of the employees is within the particular geographic region; and identifying, by the computer system, the change in market dynamics for the particular geographic region based on an aggregate change in the payroll data for the employees of the organizations.

14. The computer system of claim 10, wherein the inventory manager is further configured:

to identify a matched market for the particular geographic region from the set of geographic regions; and wherein generating the suggested inventory further comprises:

generating the suggested inventory for the business merchant based at least partially on the matched market and the transaction data for the business merchant.

15. A computer program product for managing inventory, the computer program product comprising:

a computer readable storage media;

program code, stored on the computer readable storage media, for identifying, using inventory management services of an inventory manager of a computer system, payroll data regarding employees of organizations, wherein the payroll data comprises geographic location data based at least partially on a geographic location of the organization and geographic locations of the employees;

program code, stored on the computer readable storage media, for determining, using market analysis of the inventory manager of the computer system, a change in market dynamics relating to a set of geographic regions based at least partially on the payroll data;

program code, stored on the computer readable storage media, for identifying, using the market analysis of the inventory manager of the computer system, transaction data for transactions involving a business merchant within a particular geographic region and an individual consumer;

program code, stored on the computer readable storage media, for generating, using the inventory management services of the inventory manager of the computer system, a suggested inventory for the business merchant based at least partially on the determined change in market dynamics relating to the set of geographic regions, the transaction data for the business merchant and predicted particular trends in consumer behavior within the set of geographic regions identified from emerging changes in market dynamics;

program code, stored on the computer readable storage media, for graphically displaying, using a graphical user interface of a display system of an inventory management system, the suggested inventory to the business merchant;

program code, stored on the computer readable storage media, for replenishing an inventory for the business merchant, using the inventory management services of the inventory manager of the computer system, by performing inventory replenishing operations relying upon the suggested inventory;

program code, stored on the computer readable storage media, for generating automatically a purchase order for inventory of the business merchant based on the suggested inventory;

program code, stored on the computer readable storage media, for indexing, using a data index indexing tool of inventory management services of the inventory manager of the computer system, the payroll data by the geographic location data to provide indexed payroll data that is searchable by the geographic location data; and program code, stored on the computer readable storage media, for providing using the inventory management services of the inventory manager of the computer system a search tool associated with the indexed payroll data, the search tool being in a browser of the graphical user interface of the display system and useable by a user accessing inventory management services of the inventory manager, using a user input device, to search the indexed payroll data by the geographic location data.

16. The computer program product of claim 15, wherein products associated with the transactions have a different price point than products associated with the suggested inventory.

17. The computer program product of claim 16, wherein the products associated with the suggested inventory are a down-sell, in relation to the products associated with the transactions.

18. The computer program product of claim 15 further comprising:
- program code, stored on the computer readable storage media, for identifying a matched market for the particular geographic region from the set of geographic regions; and
- wherein the program code for generating the suggested inventory further comprises:
  - program code, stored on the computer readable storage media, for generating the suggested inventory for the business merchant based at least partially on the matched market and the transaction data for the business merchant.

19. The computer program product of claim 15 further comprising:
- program code, stored on the computer readable storage media, for receiving an instruction that defines the particular geographic region.

20. The computer program product of claim 19, wherein the program code for determining the change in market dynamics further comprises:
- program code, stored on the computer readable storage media, for searching the indexed payroll data to identify the payroll data for the employees of the organizations, wherein at least one of the geographic location of the organization and geographic locations of the employees is within the particular geographic region; and
- program code, stored on the computer readable storage media, for identifying the change in market dynamics for the particular geographic region based on an aggregate change in the payroll data for the employees of the organizations.

21. The computer program product of claim 17, further comprising:
- program code, stored on the computer readable storage media, for identifying a matched market for the particular geographic region from the set of geographic regions; and
- wherein the program code for generating the suggested inventory further comprises:
  - program code, stored on the computer readable storage media, for generating the suggested inventory for the business merchant based at least partially on the matched market and the transaction data for the business merchant.

* * * * *